United States Patent
Hu

(10) Patent No.: US 10,081,079 B2
(45) Date of Patent: Sep. 25, 2018

(54) METHOD AND SYSTEM FOR CONFINED LASER CUTTING

(71) Applicant: General Electric Company, Schenectady, NY (US)

(72) Inventor: Zhaoli Hu, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/372,894

(22) Filed: Dec. 8, 2016

(65) Prior Publication Data

US 2018/0161928 A1 Jun. 14, 2018

(51) Int. Cl.
| | |
|---|---|
| *B23K 26/064* | (2014.01) |
| *B23K 26/03* | (2006.01) |
| *B23K 26/122* | (2014.01) |
| *B23K 26/146* | (2014.01) |
| *B23K 26/38* | (2014.01) |
| *B23K 101/00* | (2006.01) |

(52) U.S. Cl.
CPC .......... *B23K 26/122* (2013.01); *B23K 26/146* (2015.10); *B23K 26/38* (2013.01); *B23K 2201/001* (2013.01)

(58) Field of Classification Search
CPC ...................................... B23K 26/12–26/1494
USPC .......................................... 219/121.6–121.86
See application file for complete search history.

(56) References Cited

U.S. PATENT DOCUMENTS

| | | | |
|---|---|---|---|
| 6,038,525 A | 3/2000 | Maguire et al. | |
| 6,172,331 B1* | 1/2001 | Chen .................... | B23K 26/032 219/121.7 |
| 6,934,014 B1* | 8/2005 | Kleinhuber .......... | B23K 26/032 219/121.74 |
| 8,723,078 B2 | 5/2014 | Mazumder et al. | |
| 9,841,684 B2* | 12/2017 | Tanaka ................ | G03F 7/70483 |
| 2002/0125233 A1* | 9/2002 | Horn .................... | B23K 26/382 219/121.72 |
| 2009/0084765 A1 | 4/2009 | Muratsubaki et al. | |
| 2009/0237435 A1* | 9/2009 | Inoue ....................... | B41J 2/125 347/14 |

(Continued)

FOREIGN PATENT DOCUMENTS

| | | |
|---|---|---|
| JP | 2005288472 A | 10/2005 |
| WO | WO87/05243 A1 | 9/1987 |
| WO | WO 2016059730 | * 4/2016 |

*Primary Examiner* — Michael LaFlame, Jr.
(74) *Attorney, Agent, or Firm* — Charlotte C. Wilson; Ernest G. Cusick; Frank A. Landgraff

(57) ABSTRACT

A method of monitoring an operation status of a confined laser cutting tool includes emitting light in the form of laser beams from a laser source. The method includes using a nozzle to form a confining column composed of a liquid. The method further includes forming a confined laser beam, the confined laser beam defined by the confluence of the laser beams and the confining column. The method also includes sensing a characteristic of the confined laser beam with a sensor. The method further includes determining the operation status of the confined laser cutting tool based on the sensed characteristic of the confined laser beam. The method also includes deactivating the laser source when the sensed characteristic of the confined laser beam reaches a predetermined threshold. The method may also include providing an operator notification after deactivating the laser source.

18 Claims, 5 Drawing Sheets

(56) References Cited

U.S. PATENT DOCUMENTS

| | | | |
|---|---|---|---|
| 2009/0294423 A1* | 12/2009 | Hu | B23K 26/389 |
| | | | 219/121.72 |
| 2013/0213945 A1* | 8/2013 | Stegmann | G01N 1/286 |
| | | | 219/121.83 |
| 2013/0228695 A1* | 9/2013 | Mizoguchi | G02B 19/0095 |
| | | | 250/372 |
| 2015/0168848 A1* | 6/2015 | Tanaka | G03F 7/70041 |
| | | | 355/67 |
| 2016/0234920 A1* | 8/2016 | Suzuki | H05G 2/003 |
| 2017/0232558 A1* | 8/2017 | Kano | B23K 26/14 |
| | | | 219/121.72 |

* cited by examiner

METHOD AND SYSTEM FOR CONFINED LASER CUTTING

FIELD

The present disclosure relates to a method and system for monitoring operational status of a confined laser cutting tool.

BACKGROUND

A confined laser cutting tool utilizing a focused laser beam may be used for precise cutting or drilling on a workpiece, such as to create cooling passages through an airfoil of a turbomachine. A confined laser cutting tool includes a laser, a focusing lens, a water chamber and a nozzle. The laser passes through the focusing lens and then into the water chamber, usually via a window in the water chamber. The water chamber also includes a nozzle on the side of the water chamber facing the workpiece. The nozzle forms a water jet directed to the work piece. The focusing lens focuses the laser such that the laser passes through the water chamber and into the water jet emanating from the nozzle. The laser beam is confined within the water jet due to total internal reflection at the air-water boundary, that is, the laser beam is completely reflected at the air-water interface and thereby may be focused and guided to the workpiece. In order to achieve total internal reflection, the beam must approach the boundary at certain angles, i.e., above a particular critical angle. The jet of water also must be highly stable with consistent boundaries to prevent the laser beam from escaping. The shape and dimensions of the nozzle help to ensure proper interaction of air and water to maintain the confined laser.

Nozzles for use in such confined laser cutting tools are typically made of materials with very high hardness, such as sapphire or diamond. However, even nozzles of such material may eventually be consumed or depleted. If the nozzle of the confined laser cutting tool becomes damaged or worn, the water jet may become unstable which can reduce the ability of the water jet to focus and confine the laser, resulting in diminished energy delivered from the laser to the workpiece which impairs the function of the confined laser cutting tool.

BRIEF DESCRIPTION

Aspects and advantages of the invention are set forth below in the following description, or may be obvious from the description, or may be learned through practice of the invention.

In one exemplary aspect of the present disclosure, a method of monitoring an operation status of a confined laser cutting tool is provided. The method includes emitting light in the form of laser beams from a laser source, directing the emitted laser beams into a confining column comprised of a liquid to form a confined laser beam. The confined laser beam includes the confining column and a portion of the laser beams confined therein. The method also includes sensing a characteristic of the confined laser beam with a sensor, and determining the operation status of the confined laser cutting tool based on the sensed characteristic of the confined laser beam.

In one exemplary embodiment of the present disclosure, a confined laser cutting tool is provided. The confined laser cutting tool includes a laser source defining a beam axis, the laser source operable to emit light in the form of laser beams along the beam axis, a focusing lens, a reservoir of confining fluid, a nozzle in fluid communication with the reservoir of confining fluid, the nozzle configured to form a jet of confining fluid from the reservoir, the focusing lens aligned with the beam axis of the laser source and positioned to focus the laser beams such that the laser beams are guided and confined by the jet of confining fluid, a confined laser beam defined by the confluence of the laser beams and the jet of confining fluid, the confined laser beam operable for cutting a workpiece, a sensor operable to sense a characteristic of the confined laser beam, and a controller in operative communication with the sensor, the controller operable to receive a signal from the sensor, the signal indicative of the sensed characteristic of the confined laser beam, and the controller further operable to determine an operation status of the confined laser cutting tool based on the sensed characteristic of the confined laser beam.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

DETAILED DESCRIPTION

Figure 1:
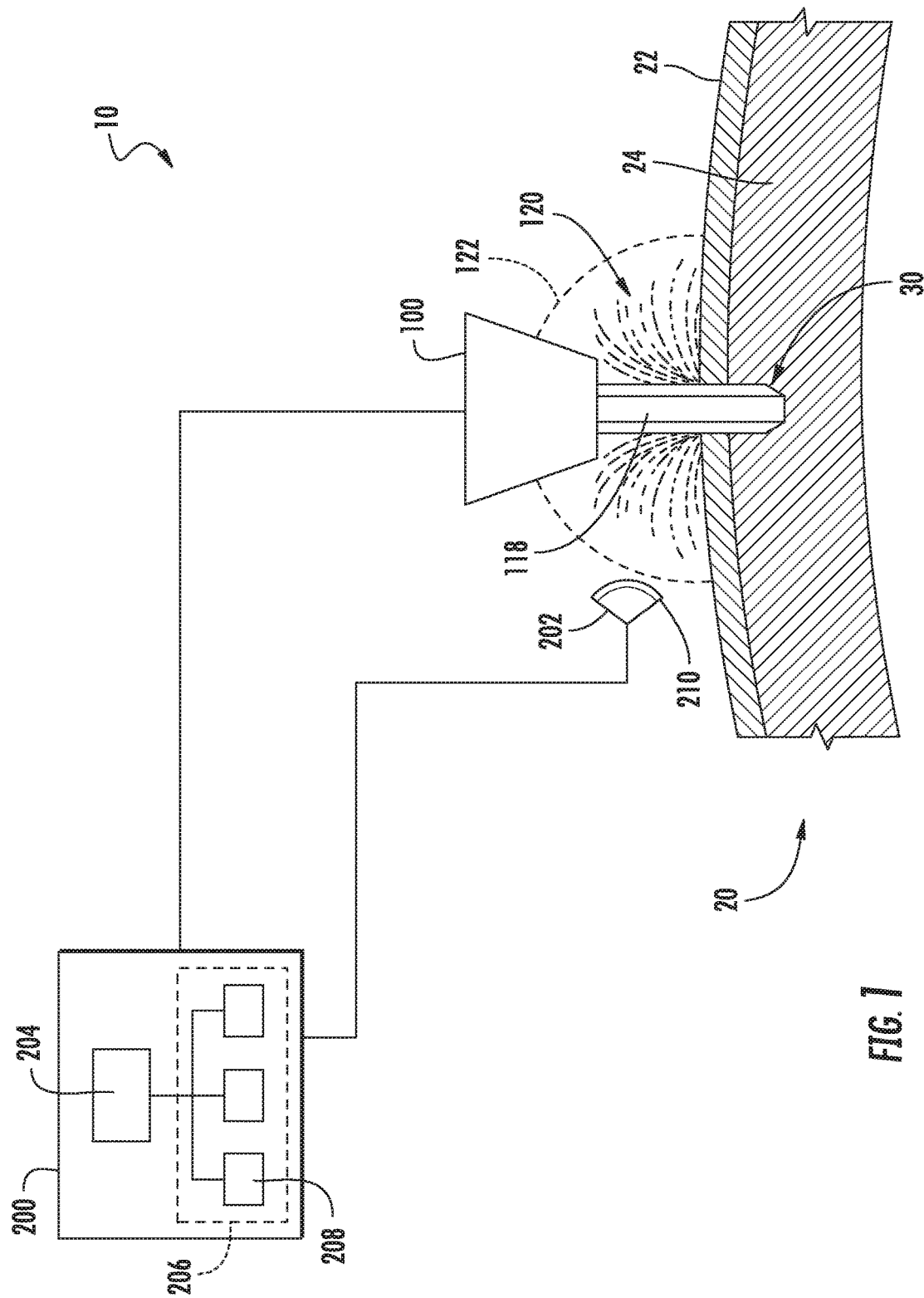
FIG. 1 is a schematic view of an exemplary confined laser cutting tool that may incorporate various embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present disclosure will be described generally in the context of manufacturing an airfoil for a turbomachine for purposes of illustration, one of ordinary skill in the art will readily appreciate that embodiments of the present disclosure may be applied to other articles of manufacture and are not limited to a system or method for manufacturing an airfoil for a turbomachine.

As used herein, the terms "first", "second", and "third" may be used interchangeably to distinguish one component from another and are not intended to signify location or importance of the individual components. Similarly, the terms "near" and "far" may be used to denote relative position of an article or component and are not intended to signify any function or design of said article or component.

Figure 4:
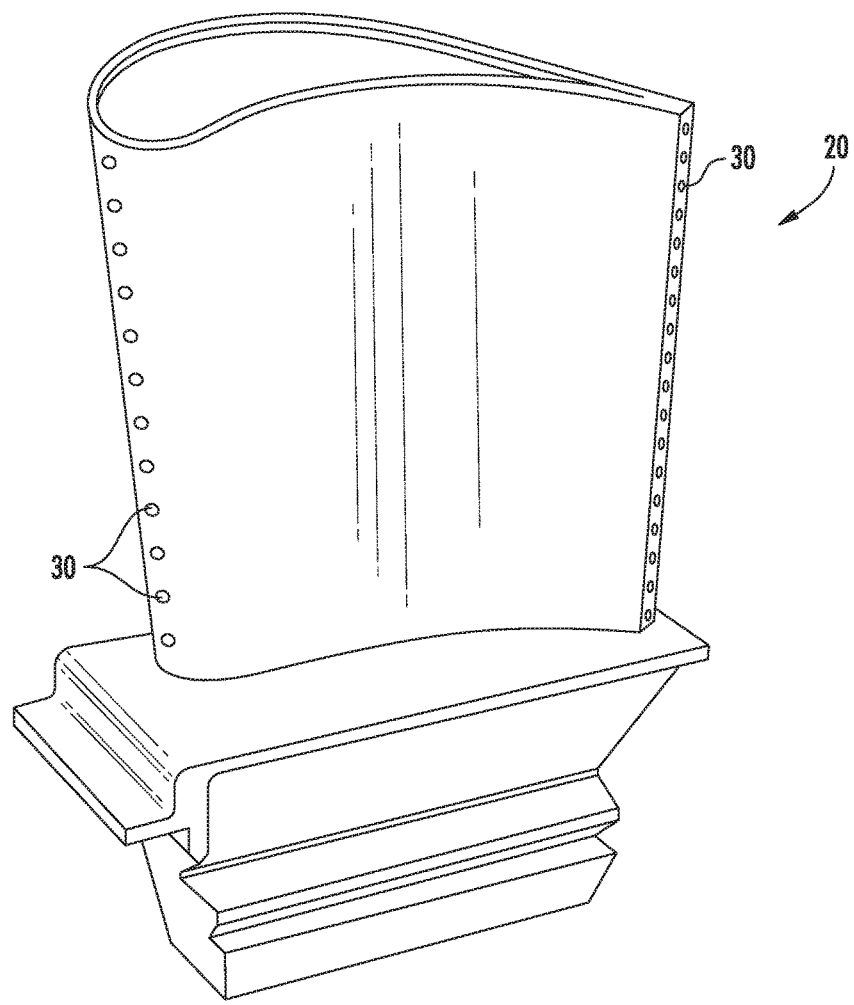
FIG. 4 is a perspective view of an exemplary workpiece as may be usable with various embodiments of the present disclosure.

Referring now to the drawings, a system 10 is illustrated therein which may be used, for example, in the manufacturing of a component for a gas turbine. More particularly, for the exemplary embodiment illustrated in the drawings, the system 10 is used for manufacturing/drilling one or more cooling passages 30 in an airfoil 20 (FIG. 4) for a gas turbine or other turbomachine (cooling passages 30 in airfoil 20 being example embodiments of a hole 30 and workpiece 20, respectively). It should be appreciated, however, that although the system 10 is described herein in the context of manufacturing the airfoil 20, in other exemplary embodiments, the system 10 may be used in manufacturing any other suitable component for a gas turbine. For example, the system 10 may be used in manufacturing transition pieces, nozzles, combustion liners, effusion or impingement plates, vanes, shrouds, or any other suitable part. Further, system 10 may be used for cutting or machining a variety of other workpieces 20 as well. For example and without limitation, embodiments of the system 10 may be used for cutting semiconductor chips out of a wafer, cutting gemstones, and/or manufacturing tool bits.

FIG. 1 provides a schematic view of an exemplary system 10 according to at least one embodiment. The system 10 generally includes a confined laser cutting tool 100 and a controller 200. The system may be operable to direct a confined laser beam 118 towards a near wall 22 of the workpiece 20 to drill a hole 30 in the near wall 22 of the workpiece 20. In the illustrated exemplary embodiment of FIG. 1, the confined laser cutting tool 100 is a drill used to form holes, such as hole 30. In various embodiments, the confined laser cutting tool 100 may be used to form round holes, shaped holes, grooves, linear cuts or kerfs, or to perform other cutting operations as desired.

As illustrated in FIG. 1, in some exemplary embodiments, the near wall 22 of the workpiece 20 may be formed from a distinct material from a substrate 24 of the workpiece 20. In particular, in the exemplary embodiment illustrated in FIG. 1, the workpiece 20 is an airfoil for a turbomachine (see also FIG. 4) having a substrate 24 formed of a metallic material, such as a high-temperature superalloy, and an outer layer formed of a thermal barrier material, e.g., a ceramic matrix composite ("CMC") material, the outer CMC layer defining near wall 22 in the illustrated example of FIG. 1. In various embodiments, the system 10 may be used for cutting other materials, such as homogenous materials, e.g., the near wall 22 is not necessarily formed of a distinct material from the remainder of the work piece 20.

Figure 2:
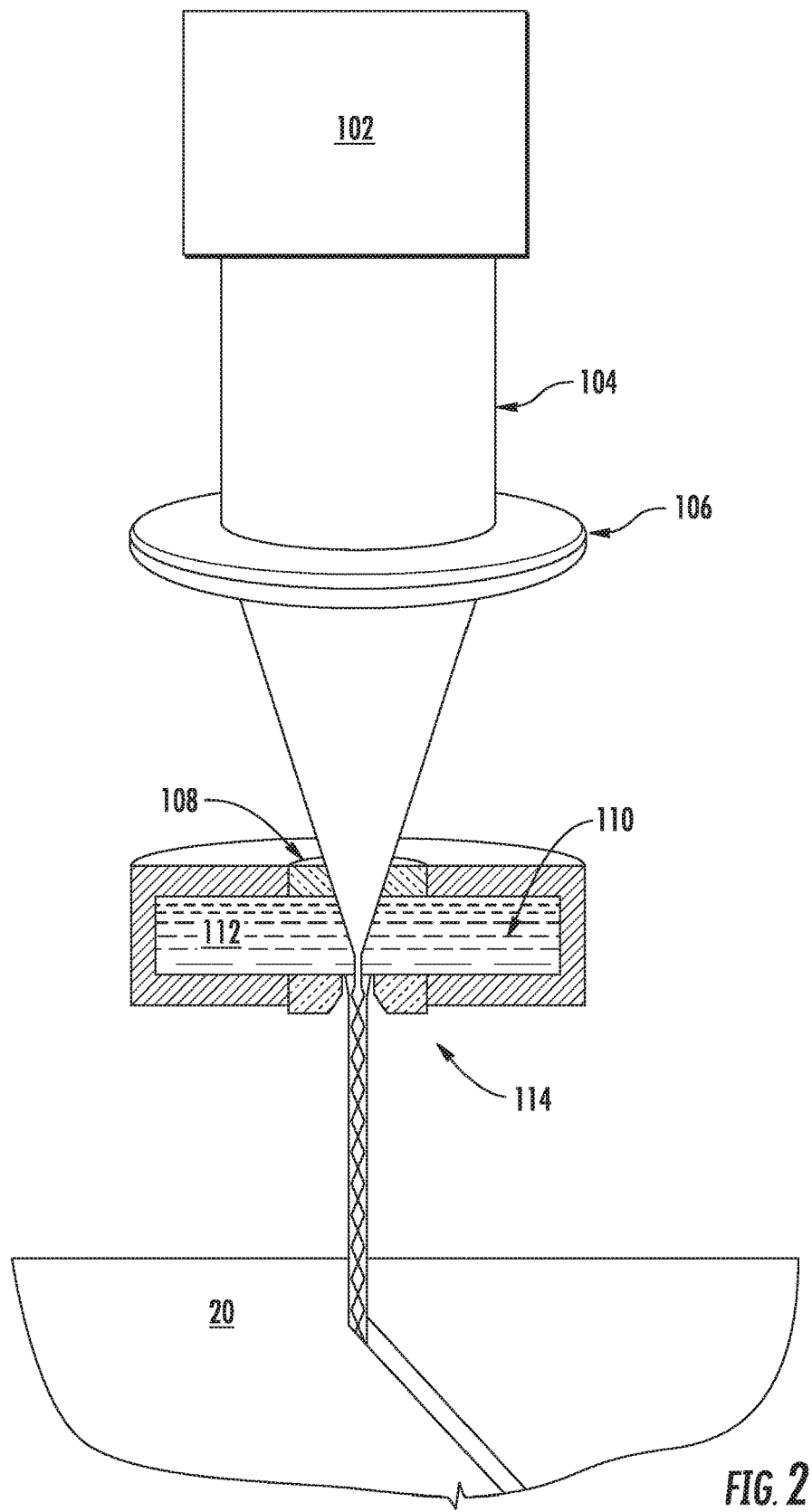
FIG. 2 is a partial view of the tool of FIG. 1.
Figure 3:
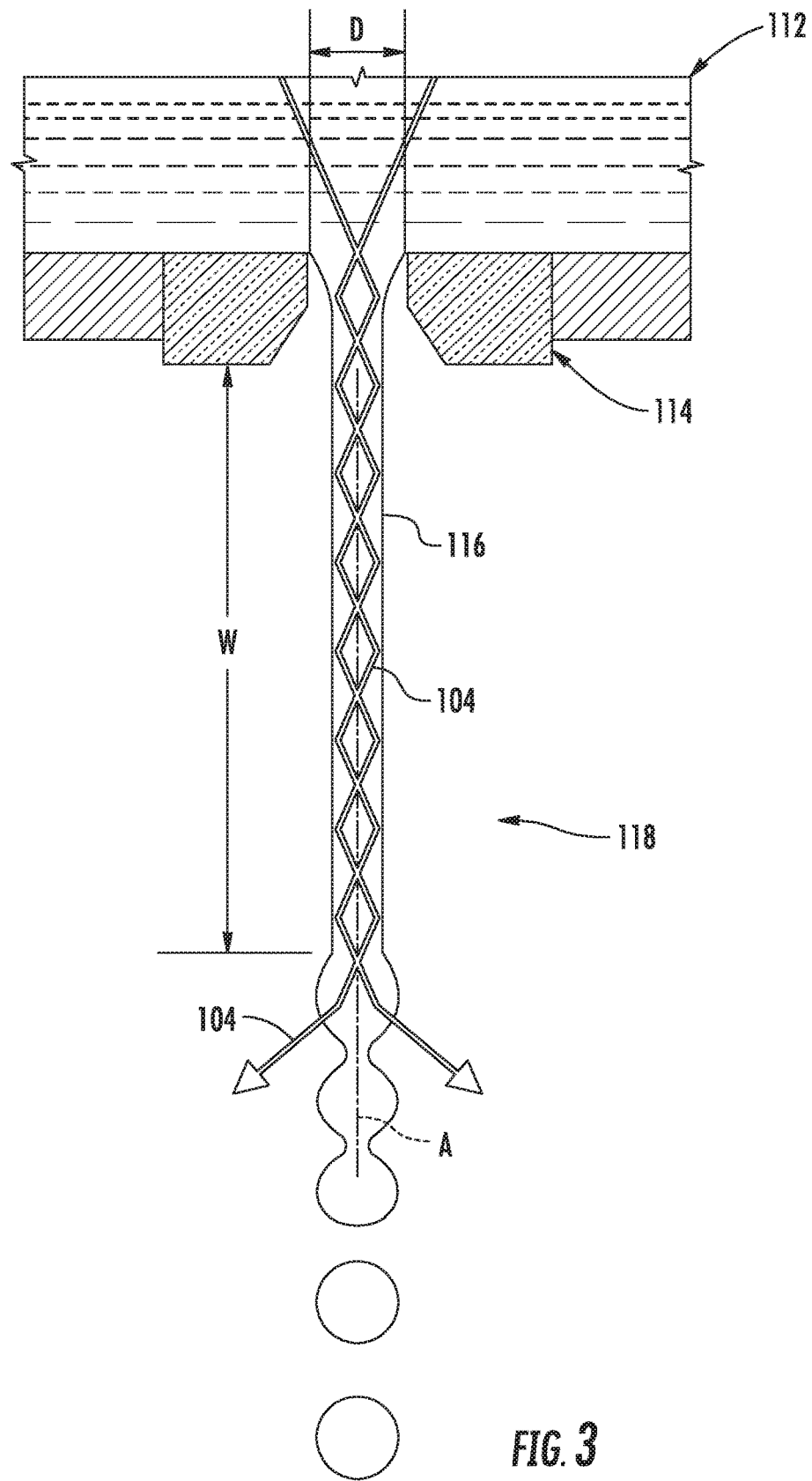
FIG. 3 is a partial view of the tool of FIG. 1.

FIGS. 2 and 3 illustrate further details of various exemplary embodiments of the confined laser cutting tool 100. The confined laser cutting tool 100 may generally include a laser mechanism 102. The laser mechanism 102 may include any device capable of generating a laser beam 104. By way of example only, in certain exemplary embodiments, laser mechanism 102 may be a diode pumped solid-state, neodymium-doped yttrium aluminum garnet (Nd:YAG) laser capable of producing a laser beam at a pulse frequency of approximately ten kilohertz to fifty kilohertz (10-50 kHz), a wavelength of approximately one micrometer (1 µm), or if utilizing second harmonic generation ("SHG") between about five hundred nanometers (500 nm) and about five hundred and fifty nanometers (550 nm), and an average power of approximately ten Watts to two hundred Watts (10-200 W). However, in other embodiments, any other suitable laser mechanism 102 may be utilized.

In the exemplary embodiment shown in FIGS. 2 and 3, the laser mechanism 102 directs laser beam 104 through a focusing lens 106. As may be seen, e.g., in FIG. 2, some exemplary embodiments include a reservoir or chamber 110 in which a liquid 112, such as purified water, is stored. In some embodiments, purified water 112 may include water that has been degassed, deionized, and/or filtered. Focusing lens 106 focuses and directs laser beams 104 into reservoir 110 via window 108. A nozzle 114 is in fluid communication with reservoir 110 to form a liquid jet which serves as the confining column 116 (sometimes referred to herein as liquid column 116). Nozzle 114, which may have a diameter D (FIG. 3) of between about twenty microns (20 µm) and about one hundred and fifty microns (150 µm), directs the laser beam 104 inside the confining column 116 toward the workpiece 20, forming confined laser beam 118. Thus, confined laser beam 118 generally includes the confining column 116 and a portion of laser beam 104. The confining column 116 may have a pressure between about seven hundred twenty five pounds per square inch (725 psi) and about seven thousand two hundred fifty pounds per square inch (7,250 psi), such as between about four thousand pounds per square inch (4,000 psi) and about four thousand five hundred pounds per square inch (4,500 psi). However, the present disclosure is not limited to any particular pressure for the confining column 116 or diameter D for nozzle 114 unless specifically recited. Additionally, it should be appreciated that as used herein, terms of approximation, such as "about" or "approximately," refer to being within ten percent above or below a stated value.

As may be seen in FIG. 3, the liquid jet which defines confining column 116 is laminar over a certain distance from the nozzle 114, but eventually becomes turbulent and unstable, such that laser beams 104 may escape from the confining column 116. When laser beams 104 are no longer contained within confining column 116, the cutting tool 100 may become less effective for cutting or drilling a workpiece. Thus, the certain distance beyond which the confining column 116 becomes unstable is known as the working distance W (FIG. 3) of the laser cutting tool 100. Generally, the working distance W may be about one thousand times the diameter D of the nozzle 114. However, if the nozzle 114 becomes worn, e.g., in an uneven manner, the flow of liquid column 116 may become more turbulent, causing the working distance W to decrease as the shape of the liquid column 116 formed by the nozzle 114 becomes less stable. In such instances, the usable life of nozzle 114 may be depleted such that nozzle 114 may need to be replaced.

As noted above, the confined laser cutting tool 100 employs total internal reflection of the laser beam 104 within the confining column 116 to effectively guide the laser beam 104 to the desired portion of the workpiece 20 for cutting thereon. When the confined laser is operating at a high intensity, the laser beams 104 excite the liquid molecules at the air-liquid boundary. The laser beams 104 may be subject to inelastic scattering, in particular, Raman scattering. That is, the laser beam 104 may impart vibrational energy to the liquid molecules of the confining column 116, causing the liquid molecules to emit light. The light emitted by the liquid molecules is sometimes referred to in the art as re-emitted light. The general principles of Raman scattering and re-emitted light are understood by those of ordinary skill in the art and are not discussed in greater detail herein.

When the flow of water jet 116 is increasingly turbulent, e.g., due to deterioration of nozzle 114, the boundaries of the confining column 116 may become unstable. The boundaries of the confining column 116 are considered unstable when the laser beams 104 escape from the confining column 116, e.g. the column 116 no longer achieves total internal reflection of the laser beam 104, such that the working distance W of cutting tool 100 is reduced. When the confining column 116 does not achieve total internal reflection of the laser beam 104, the laser beam 104 imparts less energy to the water molecules, resulting in less Raman scattering and less re-emitted light from the confined laser beam 118. Thus, a reduction in Raman scattering and re-emitted light from the confined laser beam 118 may indicate that the nozzle 114 needs to be replaced.

The confining column 116 creates a column of Raman scattered or re-emitted light in response to the laser beam 104, so long as the laser beam 104 has sufficient intensity, as described above. The shape of the re-emitted light column corresponds to the shape of the portion of the confining column 116 in which the laser beam 104 is totally internally reflected, and thus the length of the re-emitted light column corresponds to the working distance W. Accordingly, as will be described in more detail below, the column of re-emitted light may shine on a surface and thereby form a linear image having a length which is proportional to the working distance W of the confined laser cutting tool 100. In various exemplary embodiments, the column of re-emitted light may shine directly on a suitable surface to form the linear image, or may be re-directed towards a desired surface using optical devices such as are generally known in the art to form the linear image.

Returning now to FIG. 1, the exemplary system 10 illustrated therein includes a sensor 202 positioned outside the airfoil 20 and in operative communication with the controller 200. The controller 200 and sensor 202 may be operable to monitor the operation status of the confined laser cutting tool 100. In some embodiments, the monitored operation status may include the remaining usable life of the nozzle 114. In some exemplary embodiments, sensor 202 may be operable to sense a characteristic of the confined laser beam 118 (FIG. 2) and send a signal to the controller 200 indicative of the sensed characteristic. The controller 200 is operable to receive the signal from the sensor 202 which is indicative of the sensed characteristic of the confined laser beam 118, and the controller 200 may be further operable to determine an operation status of the confined laser cutting tool 100 based on the sensed characteristic of the confined laser beams 118.

In various exemplary embodiments, the controller 200 may be any suitable processor-based computing device, and may be in operable communication with, e.g., confined laser drill 100 and sensor 202. For example, suitable controllers 200 may include one or more personal computers, mobile phones (including smart phones), personal digital assistants, tablets, laptops, desktops, workstations, game consoles, servers, other computers and/or any other suitable computing devices. As shown in FIG. 1, the controller 200 may include one or more processors 204 and associated memory 206. The processor(s) 204 may generally be any suitable processing device(s) known in the art. Similarly, the memory 206 may generally be any suitable computer-readable medium or media, including, but not limited to, RAM, ROM, hard drives, flash drives, or other memory devices. As is generally understood, the memory 206 may be configured to store information accessible by the processor(s) 204, including instructions or logic 208 that can be executed by the processor(s) 204. The instructions or logic 208 may be any set of instructions that when executed by the processor(s) 204 cause the processor(s) 204 to provide a desired functionality. For instance, the instructions or logic 208 can be software instructions rendered in a computer-readable form. When software is used, any suitable programming, scripting, or other type of language or combinations of languages may be used to implement the teachings contained herein. In particular embodiments of the present disclosure, for example, the instructions or logic 208 may be configured to implement one or more of the methods described herein. Alternatively, the instructions can be implemented by hard-wired logic 208 or other circuitry, including, but not limited to application-specific circuits. Moreover, although controller 200 is depicted schematically as separate from sensor 202, in other exemplary embodiments, sensor 202 and controller 200 may be integrated into a single device positioned at any suitable location.

In some exemplary embodiments, the sensor 202 may be any sensor capable of detecting a characteristic of light from the confined laser beam 118 (FIG. 3). For example, in certain exemplary aspects, the sensor 202 may be or include a camera. Further, the camera of the sensor 202 may be directed at the confined laser cutting tool 100, and in particular at least a portion of the confined laser beam 118 formed thereby, to capture or generate an image of the confined laser cutting tool 100 and/or confined laser 118. In some embodiments, the controller 200 and/or sensor 202 may be operable to utilize an image recognition method to determine an operation status of the confined laser cutting tool 100 based on such image. In some embodiments, determining an operation status of the confined laser cutting tool 100 may include determining whether or not the usable life of the nozzle 114 has been depleted. For example, the controller 200 and/or sensor 202 may be operable to compare one or more images received from the camera of the sensor 202 to one or more stored images to determine the condition of the nozzle 114. More particularly, the controller 200 and/or sensor 202 may be operable to compare one or more images received from the camera to one or more stored images of the confined laser cutting tool 100 and/or of the confined laser beam 118, where the stored image includes or depicts an optical characteristic indicative of the nozzle 114 having been depleted. As another example, the controller 200 and/or sensor 202 may be operable to generate an image based on the sensed characteristic of the confined laser beam 118 and may further be operable to analyze the image to determine an operation status, e.g., remaining usable life of the nozzle 114, of the confined laser cutting tool 100. In some exemplary embodiments, the image may represent the amount of light at a certain wavelength generated by confined laser beam 118. In particular exemplary embodiments, the image may represent light generated by the portion of the liquid column 116 which interacts with, e.g., is excited by, the laser beam 104, as described above. In some exemplary embodiments, the image may be a digital image and analyzing the digital image may include tracking the number of pixels in the digital image, e.g., the number of pixels in the digital image may correspond to the intensity of light within the selected wavelength which may be indicative of the operation status of the confined laser cutting tool 100. In some exemplary embodiments, analyzing the image may include tracking a size or dimension of the image as well as or instead of the number of pixels. In such embodiments, the image may be a linear image having a length which is proportional to the working distance W of the confined laser cutting tool 100 and the tracked size or dimension of the image may be the length. Additionally, some exemplary embodiments may include providing a visible indicator of the operation status of the laser cutting tool 100, which may include projecting the image onto a surface such that the image provides a visible indication in real time of the operation status of the confined laser cutting tool 100.

In some embodiments, the laser beam may be a high-energy green laser, e.g., having a wavelength of between about five hundred nanometers (500 nm) and about five hundred and fifty nanometers (550 nm), such as about five hundred thirty-two nanometers (532 nm). When Raman scattering occurs, the light re-emitted by the liquid column 116, as described above, may be a lower energy light, e.g., red light having a wavelength of about six hundred and fifty nanometers (650 nm). In such embodiments, the controller 200 may be operable to measure or detect lower energy light. In some embodiments, lower energy light may be red light and the controller 200 may be operable to measure or detect an intensity of red light from the confined laser beam 118, and in particular from the liquid column 116 which forms a part of the confined laser beam 118. In some embodiments, the controller 200 may be operable to measure the intensity of the laser light at a wavelength above about five hundred and fifty nanometers (550 nm), such as above about six hundred nanometers (600 nm). In such embodiments, a decrease in red light may correspond to a decrease in the vibrational energy imparted to the liquid molecules in confining column 116 by laser beam 104 and thereby indicate a reduction in effectiveness of the confined laser cutting tool 100 and may also indicate that the nozzle 114 needs to be replaced.

For example, the sensor 202 may be a camera with a filter 210 in operative communication with the camera. Such filter may be a high-pass filter 210, and in particular a high-pass filter 210 configured to permit only light having a wavelength of about five hundred nanometers (500 nm) or greater to pass the filter. In various exemplary embodiments, the high-pass filter 210 may be configured to only permit light above any suitable wavelength to pass the filter, such as about five hundred fifty nanometers (550 nm) or greater, or about six hundred nanometers (600 nm) or greater. Accordingly, the camera 202 may measure or detect only light that is generally red light. As noted above, the presence of red light within the area of the confined laser beam 118 may indicate that Raman scattering of the laser beam 104 is occurring, e.g., that laser beam 104 has sufficient energy both to cause the liquid molecules to vibrate as the laser beam 104 is totally internally reflected within the column 116 and to efficiently and effectively cut the workpiece 20. For example, the controller 200 may be operable to generate a digital image based on the amount or intensity of red light detected by the sensor 202, and the controller 200 may further be operable to analyze the digital image by counting the number of pixels in the digital image, where the number of pixels corresponds to the intensity of red light sensed by the sensor 202. As another example, the controller 200 may be operable to generate a linear image having a length which is proportional to the working distance W of the confined laser cutting tool 100 and the controller 200 may also or instead be further operable to analyze the image by tracking the length of the linear image.

Employing a filter 210 may provide further advantages in optically measuring the confined laser beam 118. In operation, liquid from the liquid column 116 of the confined laser beam 118 may spray back away from the workpiece 20 during cutting or drilling operations. The liquid from the confined laser beam 118 may form a plume 120 of liquid back-spray surrounding the hole 30 being drilled in the near wall 22 of the airfoil 20. The plume 120 may be positioned in a backsplash area 122. Additionally, in certain exemplary embodiments, the confined laser drill 100 may be positioned within a relatively close proximity to the near wall 22 of the airfoil 20, such that the confined laser drill 100 is positioned within the backsplash area 122. For example, in certain embodiments, the confined laser drill 100 may define a clearance with the near wall 22 of the airfoil 20 of between about five millimeters (5 mm) and about twenty-five millimeters (25 mm), such as between about seven millimeters (7 mm) and about twenty millimeters (20 mm), such as between about ten millimeters (10 mm) and about fifteen millimeters (15 mm). However, in other embodiments, the confined laser drill 100 may define any other suitable clearance with the near wall 22 of the airfoil 20.

Within the plume 120, water droplets may reflect and/or refract ambient light from the confined laser beam 118, causing a glare which may interfere with some optical measurements of the confined laser beam 118. Such interference may be reduced or avoided by using a filter 210 in operative communication with sensor 202. For example, a high-pass filter 210 operable to permit only light above a certain wavelength to pass through the filter may be useful to reduce interference with optical measurements of the confined laser beam 118. For example, embodiments of the laser beams 104 which are green may create a green glare, and a high-pass filter configured to permit only red light, e.g., light having a wavelength above about five hundred fifty nanometers, to pass may eliminate the green glare.

Figure 5:
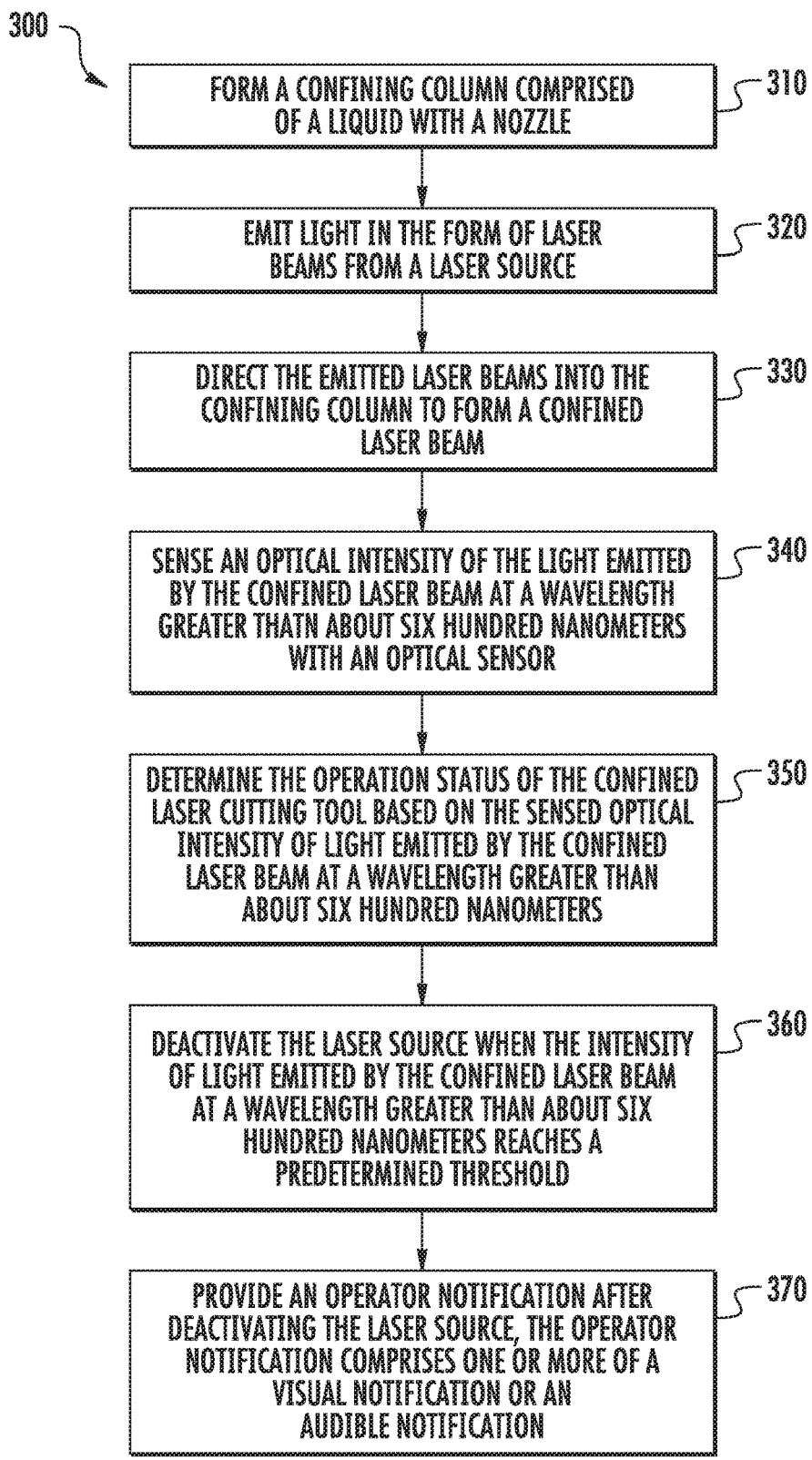
FIG. 5 is a flow diagram of an exemplary method of monitoring an operation status of a confined laser cutting tool according to one or more embodiments of the present invention.

Referring now to FIG. 5, an exemplary method 300 of monitoring an operation status of a confined laser cutting tool 100 is illustrated. The method 300 includes the step 310 of forming a confining column 116. The confining column 116 is composed of a liquid 112 and is formed with a nozzle 114. The method 300 further includes emitting light in the form of laser beams 104 from a laser source 102 at step 320, and directing the emitted laser beams 104 into the confining column 116 to form a confined laser beam 118 at step 330. The method 300 also includes sensing an optical intensity of light emitted by the confined laser beam 118 at a wavelength greater than about six hundred nanometers with an optical sensor 202 at step 340. As noted above, the confined laser beam 118 generally includes the confining column 116 and a portion of laser beam 104. In some exemplary embodiments, the light emitted by the confined laser beam 118 having a wavelength greater than about six hundred nanometers is Raman scattered light from the liquid, e.g., water, molecules in the confining column 116. The method 300 further includes determining the operation status of the confined laser cutting tool 100 based on the sensed optical intensity of light emitted by the confined laser beam 118 at a wavelength greater than about six hundred nanometers at step 350. Additionally, the exemplary method 300 includes deactivating the laser source 102 when the intensity of the light emitted by the confined laser beam 118 at a wavelength greater than about six hundred nanometers reaches a predetermined threshold at step 360. In various exemplary embodiments, the intensity of light emitted by the confined laser beam 118 at a wavelength greater than about six hundred nanometers may be directly measured or may be represented by an image. In some exemplary embodiments, the predetermined threshold may be a minimum intensity, which may be directly measured and/or may be determined by analyzing an image. Further, the exemplary method 300 may include the step of providing an operator notification at 370 after the step of deactivating at 360. The operator notification may include a visual notification, an audible notification, or both.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method of monitoring an operation status of a confined laser cutting tool, the method comprising:
    emitting light in the form of laser beams from a laser source having a beam axis;
    forming a confining column comprised of a liquid using a nozzle in fluid communication with a reservoir of confining fluid;
    directing the emitted laser beams through a focusing lens aligned with the beam axis of the laser source and positioned to focus the laser beams, such that the laser beams are guided and confined by the confining column to form a confined laser beam, the confined laser beam comprising the confining column and a portion of the laser beams confined therein, the confined laser beam operable for cutting a workpiece;
    sensing, using an optical sensor with a high-pass filter, a characteristic of the confined laser beam, the sensed characteristic of the confined laser beam comprising an intensity or a length of re-emitted light from the confined laser beam at a wavelength greater than six hundred nanometers; and
    determining, via a controller in operative communication with the sensor, the operation status of the confined laser cutting tool based on the sensed characteristic of the confined laser beam.

2. The method of claim 1, further comprising generating an image based on the sensed characteristic of the confined laser beam, and wherein the step of determining comprises analyzing the image to determine the operation status of the confined laser cutting tool.

3. The method of claim 1, wherein the step of determining comprises determining a remaining usable life of the nozzle.

4. The method of claim 1, wherein the step of forming the confining column comprises forming a cylindrical confining column.

5. The method of claim 1, further comprising providing a visible indicator of the determined operation status.

6. The method of claim 1, further comprising deactivating the confined laser beam when the sensed characteristic of the confined laser beam reaches a predetermined threshold.

7. The method of claim 6, further comprising directing the confined laser beam of the confined laser cutting tool towards a near wall of the workpiece prior to the step of deactivating, and recording the location towards which the confined laser beam was most recently directed after the step of deactivating.

8. The method of claim 7, further comprising providing an operator notification after the step of deactivating, wherein the operator notification comprises one or more of a visual notification or an audible notification.

9. The method of claim 1, wherein the method further comprises deactivating the laser source when the controller determines that the intensity of the re-emitted light from the confined laser beam at a wavelength greater than six hundred nanometers reaches a predetermined threshold.

10. The method of claim 9, further comprising forming the confining column with the nozzle prior to the step of directing the emitted laser beams into the confining column, and wherein the step of determining comprises determining a remaining usable life of the nozzle, and wherein the intensity of the re-emitted light from the confined laser beam at a wavelength greater than six hundred nanometers reaches the predetermined threshold when the remaining usable life of the nozzle is depleted.

11. A confined laser cutting tool comprising:
    a laser source defining a beam axis, the laser source operable to emit light in the form of laser beams along the beam axis;
    a reservoir of confining fluid;
    a nozzle in fluid communication with the reservoir of confining fluid, the nozzle configured to form a jet of confining fluid from the reservoir;
    a focusing lens aligned with the beam axis of the laser source and positioned to focus the laser beams such that the laser beams are guided and confined by the jet of confining fluid;
    a confined laser beam defined by the confluence of the laser beams and the jet of confining fluid, the confined laser beam operable for cutting a workpiece;
    an optical sensor with a high-pass filter operable to sense an intensity of re-emitted light from the confined laser beam at a wavelength greater than six hundred nanometers; and
    a controller in operative communication with the sensor, the controller operable to receive a signal from the sensor, the signal indicative of the sensed intensity of the confined laser beam, and the controller further operable to determine a remaining usable life of the nozzle based on the sensed intensity.

12. The confined laser cutting tool of claim 11, wherein the controller is further operable to determine that the remaining usable life of the nozzle is depleted when the sensed intensity of the re-emitted light from the confined laser beam at a wavelength greater than six hundred nanometers reaches a predetermined threshold and to deactivate the laser source after determining that the remaining usable life of the nozzle is depleted.

13. The confined laser cutting tool of claim 12, wherein the controller is further operable to provide an operator notification after deactivating the laser source, wherein the operator notification comprises one or more of a visual notification or an audible notification.

14. A confined laser cutting tool comprising:
    a laser source defining a beam axis, the laser source operable to emit light in the form of laser beams along the beam axis;
    a reservoir of confining fluid;
    a nozzle in fluid communication with the reservoir of confining fluid, the nozzle configured to form a jet of confining fluid from the reservoir;
    a focusing lens aligned with the beam axis of the laser source and positioned to focus the laser beams such that the laser beams are guided and confined by the jet of confining fluid;
    a confined laser beam defined by the confluence of the laser beams and the jet of confining fluid, the confined laser beam operable for cutting a workpiece;

an optical sensor with a high-pass filter operable to sense a length of a column of light re-emitted by the confining column at a wavelength greater than six hundred nanometers; and a controller in operative communication with the sensor, the controller operable to receive a signal from the sensor, the signal indicative of the sensed length of the re-emitted light column, and the controller further operable to determine a remaining usable life of the nozzle based on the sensed length of the re-emitted light column.

15. The confined laser cutting tool of claim 14, wherein the controller is further operable to determine that the remaining usable life of the nozzle is depleted when the sensed length of the re-emitted light column reaches a predetermined threshold and to deactivate the laser source after determining that the remaining usable life of the nozzle is depleted.

16. The confined laser cutting tool of claim 15, wherein the controller is further operable to provide an operator notification after deactivating the laser source, wherein the operator notification comprises one or more of a visual notification or an audible notification.

17. The confined laser cutting tool of claim 11, wherein the confining fluid is a liquid.

18. The confined laser cutting tool of claim 14, wherein the confining fluid is a liquid.

* * * * *